(12) United States Patent
Pearce

(10) Patent No.: US 7,584,555 B2
(45) Date of Patent: *Sep. 8, 2009

(54) HIDDEN-TYPE CONVERTIBLE SHOE

(75) Inventor: Frank Gerald Pearce, Richardson, TX (US)

(73) Assignee: Convertible Shoe, LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/944,790

(22) Filed: Nov. 26, 2007

(65) Prior Publication Data

US 2008/0072456 A1   Mar. 27, 2008

Related U.S. Application Data

(63) Continuation of application No. 11/214,271, filed on Aug. 29, 2005, now Pat. No. 7,318,260.

(60) Provisional application No. 60/619,659, filed on Oct. 18, 2004.

(51) Int. Cl.
*A43B 3/24* (2006.01)
(52) U.S. Cl. ........................................................ 36/101
(58) Field of Classification Search .................. 36/101, 36/100, 15; 24/681, 662, 108, 110
See application file for complete search history.

(56) References Cited

U.S. PATENT DOCUMENTS

| | | | |
|---|---|---|---|
| 1,232,321 A | 7/1917 | Johnson | |
| 1,550,006 A | 8/1925 | Carlson | |
| 1,563,520 A | 12/1925 | Owen | |
| 1,566,023 A | 12/1925 | Kuehner | |
| 1,661,520 A | 3/1928 | Wullum | |
| 1,823,229 A | 9/1931 | Balbaud | |
| 2,368,314 A * | 1/1945 | Herman | 36/11.5 |
| 2,430,338 A | 11/1947 | Heiman | |
| 2,510,236 A | 6/1950 | Kutcher | |
| 2,761,224 A * | 9/1956 | Gardiner | 36/11.5 |
| 2,873,540 A | 2/1959 | Murphy | |
| 2,944,241 A | 7/1960 | Londell, Jr. | |
| 3,032,896 A | 5/1962 | Weaver | |
| 3,099,884 A | 8/1963 | Kixmiller et al. | |
| 3,167,835 A | 2/1965 | Bengtsson | |
| 3,376,616 A | 4/1968 | Kaczorowski | |
| 3,436,844 A | 4/1969 | Sachs | |

(Continued)

FOREIGN PATENT DOCUMENTS

DE    1 279 295    10/1968

(Continued)

*Primary Examiner*—Ted Kavanaugh
(74) *Attorney, Agent, or Firm*—Brooks Kushman P.C.

(57) ABSTRACT

A shoe comprising a shoe upper including a male member and a shoe sole including a female receptor for locking with the male member. The male member locks with the female receptor by moving the male member with respect to the female receptor in a first direction, which locks the shoe upper with the shoe sole. The male member unlocks from the female receptor by moving the male member an additional distance further in the first direction, which unlocks the shoe upper from the shoe sole. The female receptor includes resilient arms to hold and release the male member and a stop to prevent movement of the resilient arms in a second direction.

20 Claims, 2 Drawing Sheets

U.S. PATENT DOCUMENTS

| | | | |
|---|---|---|---|
| 3,902,259 A | 9/1975 | Cracco | |
| 3,983,642 A | 10/1976 | Liao | |
| 4,035,877 A | 7/1977 | Brownson et al. | |
| 4,110,873 A | 9/1978 | Verchere | |
| 4,114,296 A | 9/1978 | Smith | |
| 4,172,330 A | 10/1979 | Kao | |
| 4,193,214 A | 3/1980 | Wang | |
| 4,267,649 A | 5/1981 | Smith | |
| 4,363,177 A | 12/1982 | Boros | |
| 4,439,935 A | 4/1984 | Kelly | |
| 4,450,633 A | 5/1984 | Connelly | |
| 4,461,102 A | 7/1984 | De Vincentis | |
| 4,682,688 A | 7/1987 | Budert | |
| 4,688,337 A | 8/1987 | Dillner et al. | |
| 4,802,266 A | 2/1989 | Doty et al. | |
| 4,805,320 A | 2/1989 | Goldenberg et al. | |
| 4,839,948 A * | 6/1989 | Boros | 36/101 |
| 4,887,369 A | 12/1989 | Bailey et al. | |
| 4,998,329 A | 3/1991 | Boros | |
| 5,018,252 A | 5/1991 | Butler | |
| 5,339,543 A | 8/1994 | Lin | |
| 5,381,610 A | 1/1995 | Hanson | |
| 5,533,280 A | 7/1996 | Halliday | |
| 5,896,684 A | 4/1999 | Lin | |
| 5,983,528 A | 11/1999 | Hartung | |
| 5,991,950 A | 11/1999 | Schenkel | |
| 5,992,058 A | 11/1999 | Jneid | |
| 6,086,449 A | 7/2000 | Sharp | |
| 6,154,936 A | 12/2000 | Howell et al. | |
| 6,176,660 B1 | 1/2001 | Lewis et al. | |
| 6,349,486 B1 | 2/2002 | Lin | |
| 6,418,643 B1 | 7/2002 | Yang | |
| 6,430,846 B1 | 8/2002 | Lin | |
| 6,442,870 B1 | 9/2002 | Tsai | |
| 6,533,515 B2 | 3/2003 | Meyer | |
| 6,581,255 B2 | 6/2003 | Kay | |
| 6,640,373 B2 | 11/2003 | Tsai | |
| 6,651,359 B1 | 11/2003 | Bricker | |
| 7,318,260 B2 * | 1/2008 | Pearce | 24/681 |
| 2002/0124434 A1 | 9/2002 | Hsin et al. | |
| 2002/0174569 A1 | 11/2002 | Tsai | |
| 2002/0194750 A1 | 12/2002 | Feick | |

FOREIGN PATENT DOCUMENTS

| | | |
|---|---|---|
| EP | 0 888 729 A1 | 1/1999 |
| GB | 713290 | 8/1954 |
| GB | 1 232 321 | 5/1971 |
| GB | 2 143 420 A | 2/1985 |
| WO | WO 03/075696 A1 | 9/2003 |

* cited by examiner

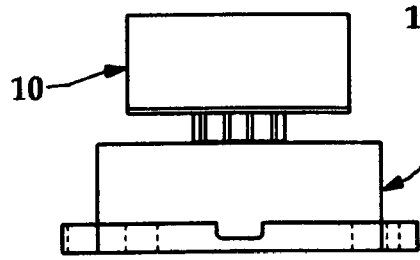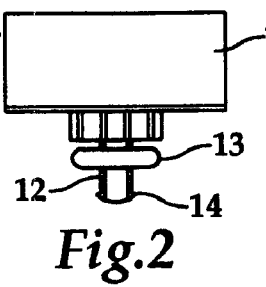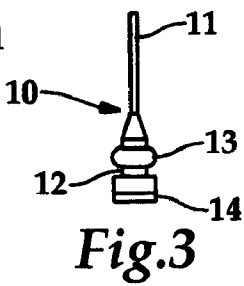
Fig.1  Fig.2  Fig.3
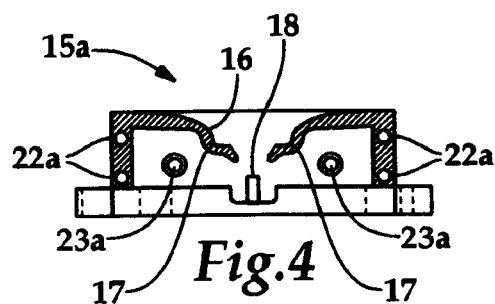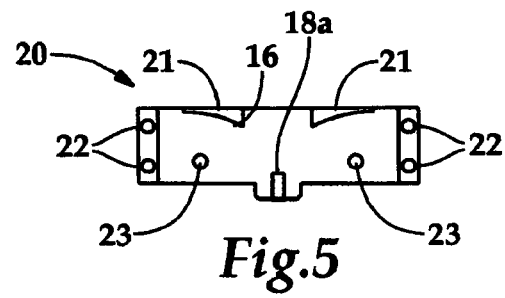
Fig.4  Fig.5
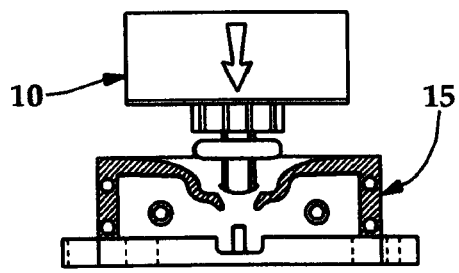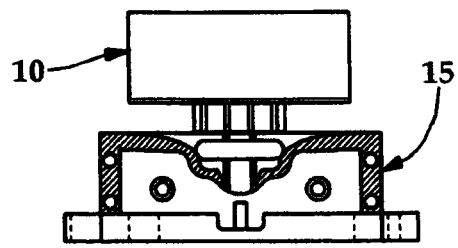
Fig.6  Fig.7
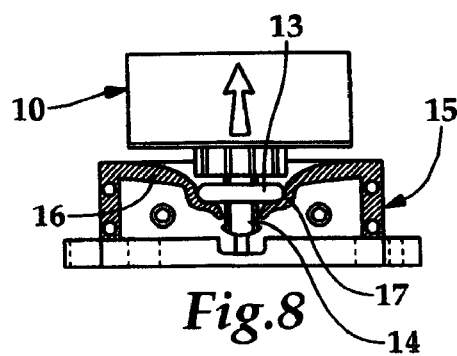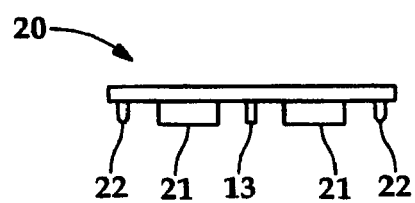
Fig.8  Fig.9

HIDDEN-TYPE CONVERTIBLE SHOE

CROSS-REFERENCE TO RELATED APPLICATIONS

The present application claims priority to and is a continuation of U.S. Ser. No. 11/214,271 filed on Aug. 29, 2005, now U.S. Pat. No. 7,318,260 which claims the benefit of provisional application Ser. No. 60/619,659 filed on Oct. 18, 2004, both of which are hereby incorporated by reference in their entirety.

TECHNICAL FIELD

The present invention relates generally to locking mechanisms and more particularly to a hidden-type locking mechanism that is especially useful for a convertible shoe that allows a consumer to easily remove a shoe upper and replace it for uppers of different styles, functionality, and colors.

BACKGROUND OF THE INVENTION

Manufacturers and retailers have long known the value of a convertible shoe that allows a consumer to detachably secure a plurality of shoe uppers to a single pair of shoe soles. In addition to the economic advantage of replacing numerous pairs of shoes with a single pair of shoe soles and a variety of uppers, such a shoe has other advantages, including conservation of space during travel. Prior attempts to produce such a shoe have not been successful in that they suffer from many disadvantages, including complexity of manufacture, difficulty of use, unreliability, and unconventional appearance. Such attempts have included efforts to attach shoe uppers to a shoe sole using snap fasteners, such as in U.S. Pat. No. 5,992,058 to H. Jneid, and using zippers, such as in U.S. Pat. No. 5,983,528 to P. Hartung. These attempts failed to provide functionality in that they are overly complex and do not provide a hidden-type connection. Recent embodiments for a convertible shoe have attempted to substantially hide the connection between vamp and sole, including U.S. Pat. No. 6,349,486 to G. Lin utilizing clips and U.S. Pat. No. 6,430,846 to G. Lin using a pushbutton locking mechanism. Yet, such attempts have not adequately solved the problem of ease of manufacturing while providing secure locking, hidden view, and facility of use by the consumer. For example, the patent to Lin requires difficult and expensive manufacturing techniques to insure that the push button is accurately positioned and to prevent foaming material from fouling the internal components. In addition, the push button is visible, or, if attempted to be hidden, presents substantial manufacturing difficulty and increased costs. Furthermore, such mechanisms must be located along the outer perimeter of the shoe sole such that the pushbutton is accessible, thus preventing its application to thong style shoe designs in which one upper connection is positioned toward the center and away from the perimeter of the shoe sole.

OBJECTS OF THE INVENTION

One object of the invention is to improve the versatility and function of locking mechanisms for fastening materials or objects.

Another object of the invention is to improve locking mechanisms that can be substantially hidden from view during use.

An additional object is to improve the appearance and operation of locking mechanisms by eliminating external release members while providing secure and reliable locking function.

A further object of the invention is to improve hidden-type locking mechanisms for a convertible shoe.

Still another object is to reduce the complexity of hidden-type locking mechanisms for ease of manufacturing and reduction of costs.

DISCLOSURE OF THE INVENTION

With the limitations of the previous attempts in mind, the present invention provides an improved locking mechanism that overcomes the deficiencies recited above. The present invention has numerous applications, including but not limited to accessories such as belts and purses as well as utility items such as containers, luggage, and the like. The invention is especially useful for a hidden-type convertible shoe since no external release buttons or levers are utilized, thus simplifying the manufacturing process and improving both function and aesthetic appeal.

The locking mechanism of the present invention is comprised of a male latch member and a female receptacle. The male latch member includes an arbor with a planar handle at its proximal end and a catch apparatus at its distal end. A slidable annulus is permanently mounted to the arbor and moves between the catch apparatus and the lower margin of the planar handle. Locking of the mechanism is achieved by pressing the male latch member into the female receptacle such that the resilient arms open and then springably close behind the catch apparatus. Separation forces tending to induce upward motion of the resilient arms during use are resisted by stops along the top perimeter of the female receptacle. Unlocking is achieved by pressing the male latch member further into the female receptacle such that the slidable annulus first urges open the resilient arms and is then removably pressure captured in the resilient arm notches. The male latch member is then retracted. During retraction of the male latch member, the slidable annulus is dislodged by the catch apparatus, thus allowing for complete separation of the male latch member from the female receptacle.

The locking mechanism of the present invention is ideal for mass production through plastic injection molding using a variety of plastic materials, including polyoxymethylene and nylon resins and their polymers to form the female receptacle, male latch member, and slidable annulus, such that optimum operation, strength, and durability are achieved.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 1 is an elevation front view of the latch mechanism of the present invention;

FIG. 2 is an elevation front view of the male latch member of the present invention;

FIG. 3 is an elevation side view of the male latch member of the present invention;

FIG. 4 is a sectional view of the female receptacle of the present invention;

FIG. 5 is an elevation front view of the female receptacle cover with stops;

FIG. 6 is a sectional view of the male latch member entering the female receptacle;

FIG. 7 is a sectional view of the male latch member fully seated in the female receptacle;

FIG. 8 is a sectional view of the male latch member being retracted from the female receptacle;

FIG. 9 is a top view of the female receptacle cover with stops;

DETAILED DESCRIPTION

Figure 10:
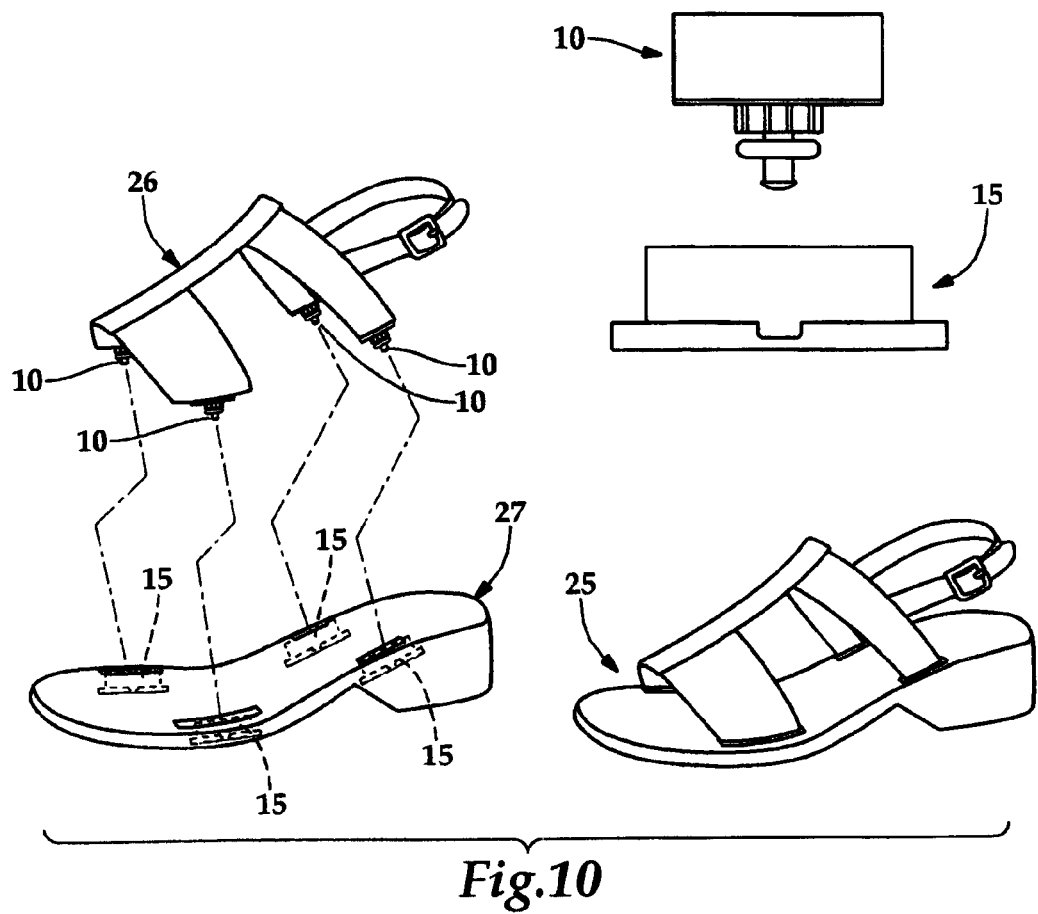
FIG. 10 is a plan view of the embodiment of the present invention in a convertible shoe.

Referring to the drawings, and specifically to FIG. 1, the present invention includes a locking mechanism comprised of a female receptacle 15 and a male latch member 10. Now referring to FIGS. 4 and 5, the female receptacle 15 is comprised of a primary housing 15A to house the female receptacle 15 and which is shown as a rectangle, insertion guide 18 which is formed in the bottom of the female receptacle, and resilient arms 16 with capture notches 17 to hold the male latch member 10. A cover 20 to hold together the female receptacle 15 is fitted with insertion guide 18A and has integral stops 21 along the top perimeter of cover 20. The cover 20 is further fitted with pins 22 and 23 for insertion into registers 22A and 23A of the primary housing 15A to effect complete assembly of the female receptacle. Referring now to FIGS. 2 and 3, the male latch member 10 is comprised of an arbor 12 with planar handle 11 at its proximal end and catch apparatus 14 at its distal end. A slidable annulus 13 is mounted to the arbor 12 and moves between the catch apparatus 14 and lower margin of the planar handle 11. Now referring to FIGS. 6 and 7, locking of the mechanism is achieved by pressing the male latch member 10 into the female receptacle 15 such that resilient arms 16 are urged open by, and then springably close behind, the catch apparatus 14. Stops 21 as shown in FIG. 5 prevent upward travel of the resilient arms 16 tending to be induced by separation forces while the locking mechanism is in use. FIG. 9 shows the stops 21 with a cavity for the catch apparatus 14 of the male latch member 10 forming the top of cover 20.

Referring now to FIG. 8, unlocking of the mechanism is achieved by pressing the male latch member 10 further in the first direction into the female receptacle 15 such that the slidable annulus 13 urges open the resilient arms 16, is pressure captured in the resilient arm notches 17, and is dislodged by catch means 14 during upward withdrawal in the second direction of the male latch member 10, thus completely unlocking the mechanism.

In the embodiment showing FIG. 10, a plurality of female receptacles 15 are embedded permanently in a shoe sole 27 and a corresponding number of male latch members 10 are affixed to the lower perimeter of the shoe upper 26 at their planar handles 11. In this embodiment, the shoe upper 26 is detachably mounted to the shoe sole 27 such that uppers of various styles, colors, and functionality may be engaged with a single pair of shoe soles. To facilitate a hidden-type connection, the top surfaces of the female receptacles 15 are recessed into the shoe sole 27 such that when the uppers 26 are mounted to the sole 27, that portion of the upper attached to the planar handle 11 of the male latch member 10 resides substantially below the top surface of the shoe sole 27, thus giving the fully assembled convertible shoe 25 the appearance of a conventional shoe.

Referring now to FIGS. 1 through 10, engagement of the shoe upper 26 to the shoe sole 27 is accomplished by grasping that portion of the upper affixed to the planar handle 11 and pressing the male latch member 10 into the female receptacle 15 in the first direction. Locking may be indicated by an audible clicking sound that signals that the catch apparatus 14 has been captured by the resilient arms 16. Disengagement is achieved by grasping the upper 26 at the planar handle 11 and pushing the male latch member 10 deeper into the female receptacle 15 in the first direction, thus forcing the slidable annulus 13 to urge open the resilient arms 16. During this action, the slidable annulus 13 is removably captured by the resilient arm notches 17. An audible clicking sound may signal that the slidable annulus 13 has been captured. The male latch member 10 is then withdrawn in the second direction as previously described. This embodiment provides a secure, hidden-type connection that can be easily and quickly engaged and disengaged, while providing the appearance and aesthetic appeal of a conventional shoe.

Although preferred embodiments of the invention have been described in the foregoing detailed description and illustrated in the accompanying drawings, it will be understood that the invention is not limited to the embodiments disclosed, and particularly to shoe applications, but is capable of rearrangements, modifications, and substitution of parts and elements as well as use in numerous devices requiring a quick release locking mechanism. The present invention is therefore intended to encompass such rearrangements, modifications and substitutions of parts and elements as fall within the spirit and scope of the invention.

What is claimed is:

1. A shoe comprising:
    a shoe upper including a male member; and
    a shoe sole including a female receptor for locking with the male member,
    the male member locking with the female receptor by moving the male member with respect to the female receptor in a first direction, thereby locking the shoe upper with the shoe sole,
    the male member unlocking from the female receptor by moving the male member an additional distance further in the first direction, thereby unlocking the shoe upper from the shoe sole, and
    the female receptor including resilient arms to hold and release the male member and a stop to prevent movement of the resilient arms in a second direction.

2. The shoe of claim 1, wherein the shoe upper includes a number of distal portions including a corresponding number of male members.

3. The shoe of claim 1, wherein the shoe sole includes a number of female receptors spaced proximate and substantially to a perimeter side of the shoe sole.

4. The shoe of claim 1, wherein the shoe sole includes a front portion and a rear portion and the rear portion includes first and second rear female receptors.

5. The shoe of claim 4, wherein the front portion the shoe sole includes first and second front female receptors.

6. The shoe of claim 1, wherein the shoe sole includes a top surface and the female receptor is recessed into the shoe sole such that when the male member is locked with the female receptor, the male member resides substantially below the top surface of the shoe sole.

7. The shoe of claim 1, wherein the female receptor is permanently embedded in the shoe sole.

8. A shoe sole for detachable mounting to a shoe upper, the shoe sole comprising:
    a perimeter side;
    a top surface;
    a bottom surface;
    a shoe sole body at least partially bounded by the perimeter side, the top surface and the bottom surface; and a female receptor disposed at least partially within the shoe sole body, the female receptor for locking with a male member of the shoe upper by moving the female receptor with respect to the male member in a first direction, the female receptor including resilient arms to hold and release the male member and a stop to prevent movement of the resilient arms in a second direction, and the female receptor unlocking from the male member by moving the female receptor an addition distance further in the first direction.

9. The shoe sole of claim 8 further comprising a number of female receptors spaced proximate and substantially parallel to the perimeter side of the shoe sole.

10. The shoe sole of claim 8, wherein the shoe sole body includes a front portion and a rear portion and the rear portion includes first and second rear female receptors.

11. The shoe sole of claim 8, wherein the female receptor is permanently embedded in the shoe sole body.

12. The shoe sole of claim 8, wherein the female receptor includes an insertion guide.

13. The shoe sole of claim 8, wherein a portion of the resilient arms contacts the stop while preventing movement of the resilient arms in the second direction.

14. A shoe upper for detachable mounting to a shoe sole, the shoe upper comprising:
a lower perimeter; and
a male member proximate to the lower perimeter, the male member locking with a female receptor of the shoe sole by moving the male member with respect to the female receptor in a first direction, the male member unlocking from the female receptor by moving the male member an additional distance further in the first direction, the male member including a slidable member to release the male member, the male member including an arbor to allow the slidable member to slide along the arbor.

15. The shoe upper of claim 14, wherein the male member includes a catch apparatus to engage the resilient arms to lock the male member to the female receptor.

16. The shoe upper of claim 14, wherein the lower perimeter includes a first and second strap portion.

17. The shoe upper of claim 16, further comprising a first and second male member proximate to the first and second strap portions, respectively.

18. The shoe upper of claim 14, wherein the male member is affixed to the lower perimeter of the shoe upper.

19. The shoe upper of claim 15, wherein the slidable member is slidable along the arbor between a first position and a second position.

20. The shoe upper of claim 19, wherein the first position is closer to the catch apparatus than the second position.

* * * * *

UNITED STATES PATENT AND TRADEMARK OFFICE
CERTIFICATE OF CORRECTION

PATENT NO.        : 7,584,555 B2  
APPLICATION NO.   : 11/944790  
DATED             : September 8, 2009  
INVENTOR(S)       : Frank Gerald Pearce Page 1 of 1

It is certified that error appears in the above-identified patent and that said Letters Patent is hereby corrected as shown below:

Column 5, Line 9, Claim 8:

Delete "addition distance" and insert -- additional distance --.

Signed and Sealed this

Twenty-seventh Day of October, 2009

David J. Kappos  
*Director of the United States Patent and Trademark Office*